March 15, 1938.　　　　　E. T. JOHNSON　　　　　2,111,323
ENSILAGE HARVESTER
Filed April 23, 1936　　　　5 Sheets-Sheet 1
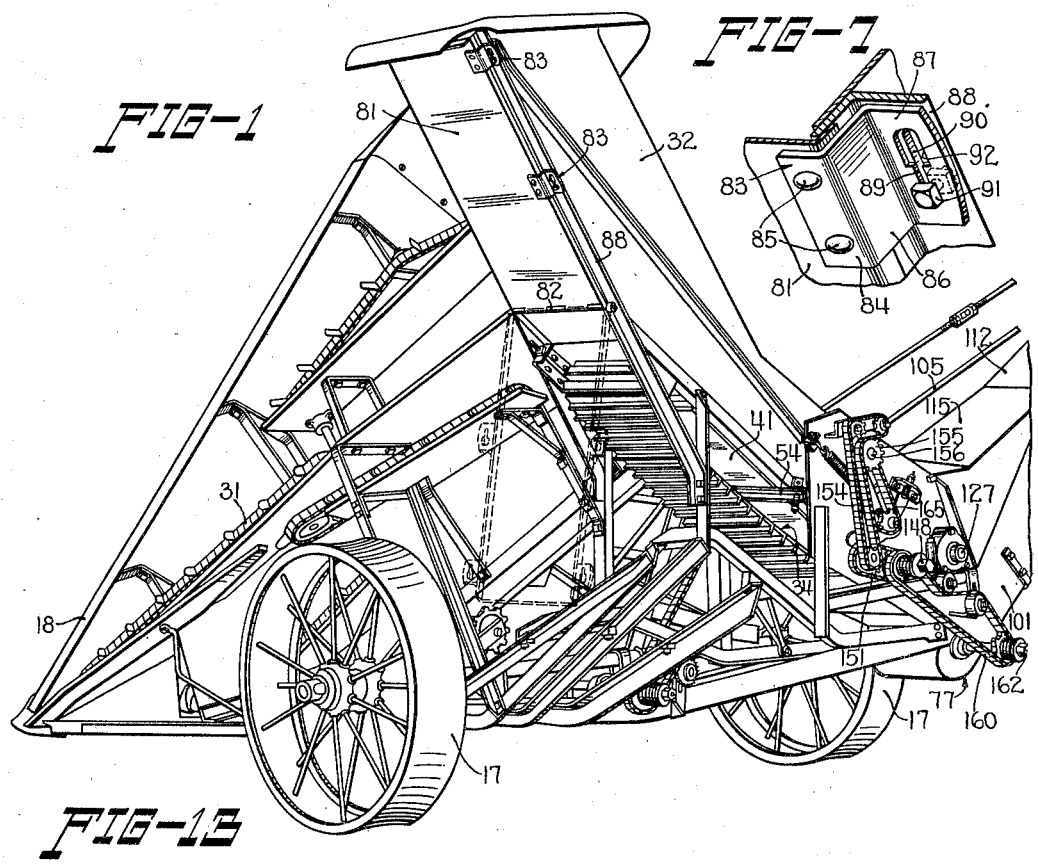
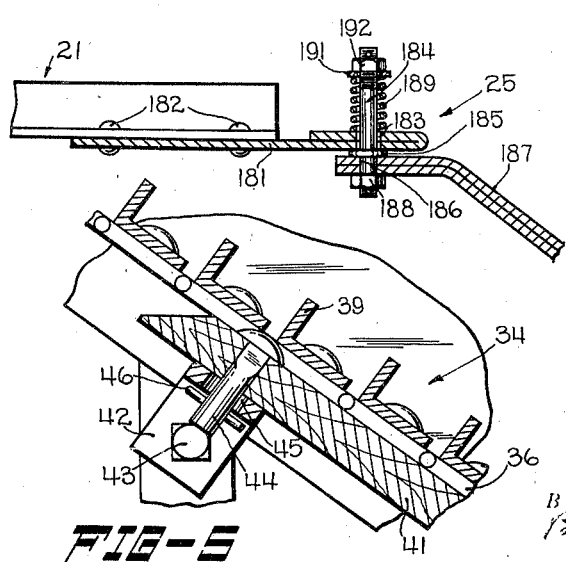
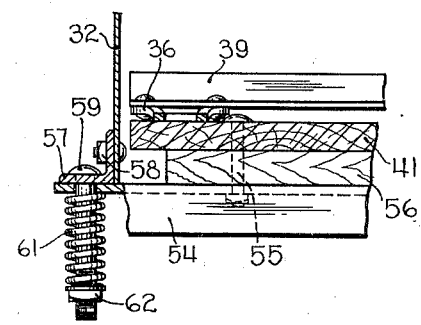
INVENTOR
Ellsworth T. Johnson,
BY
Brown, Jackson, Boettcher & Dienner.
ATTORNEYS.

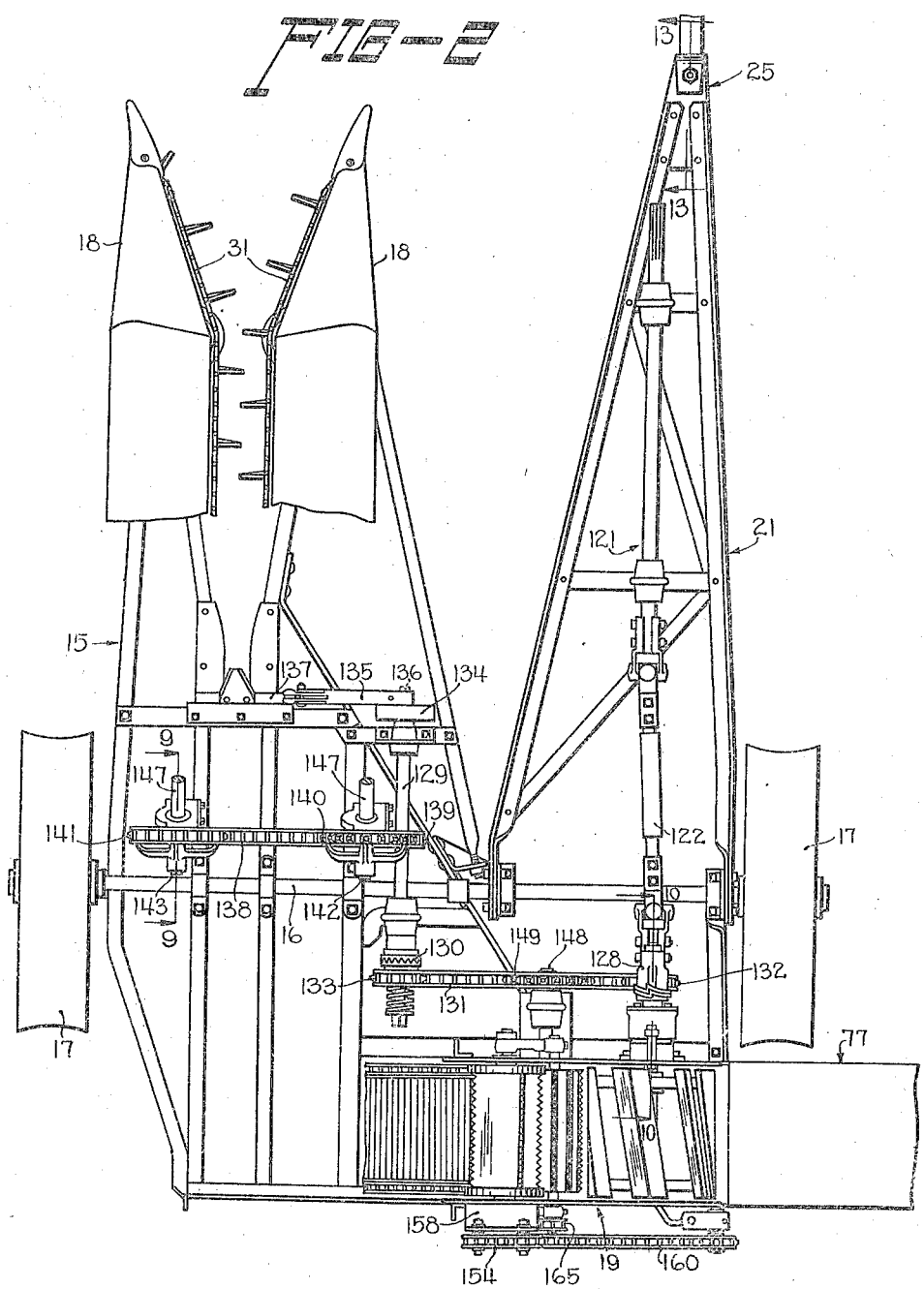

March 15, 1938. E. T. JOHNSON 2,111,323
ENSILAGE HARVESTER
Filed April 23, 1936 5 Sheets-Sheet 3
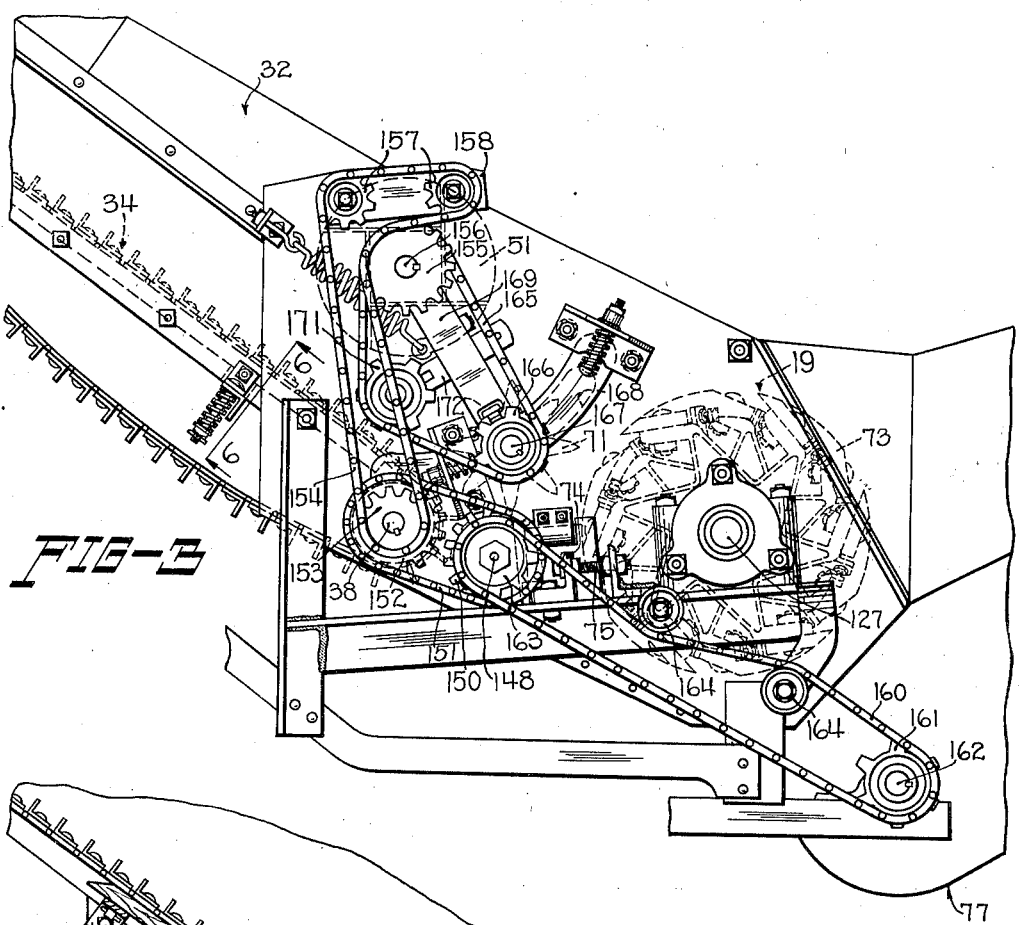
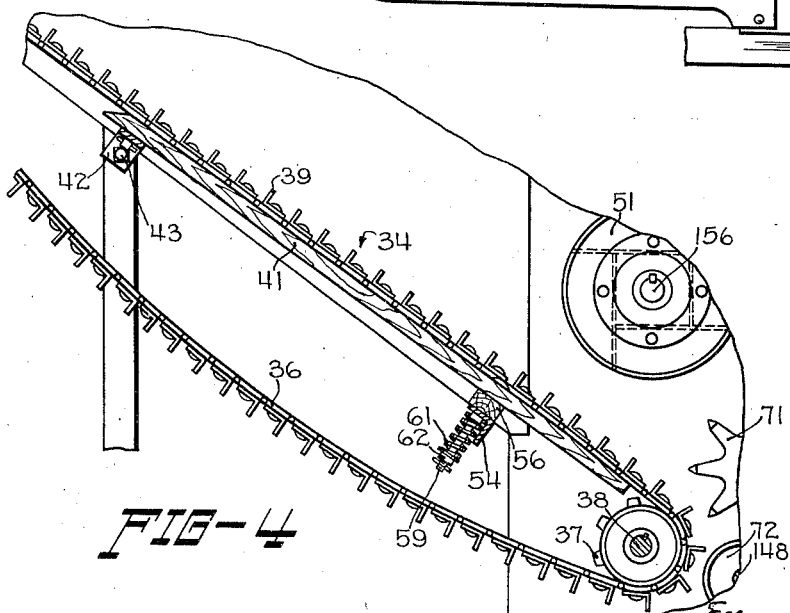
INVENTOR
Ellsworth T. Johnson
BY
ATTORNEYS.

March 15, 1938.                E. T. JOHNSON                2,111,323
                              ENSILAGE HARVESTER
                           Filed April 23, 1936            5 Sheets-Sheet 4

INVENTOR
Ellsworth T. Johnson,
BY Brown, Jackson, Boettcher & Dienner
ATTORNEYS.

March 15, 1938. E. T. JOHNSON 2,111,323
ENSILAGE HARVESTER
Filed April 23, 1936 5 Sheets-Sheet 5
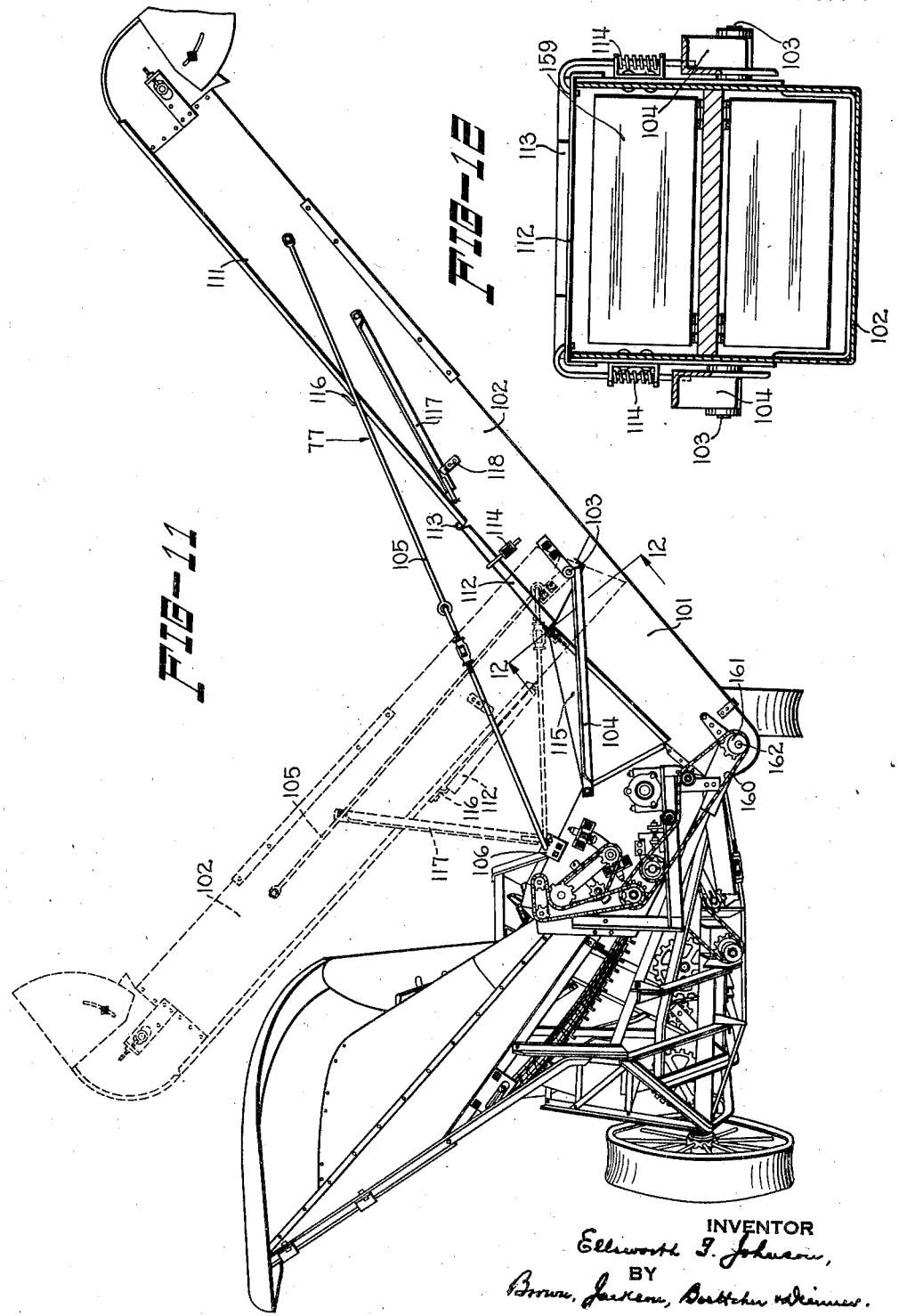

Patented Mar. 15, 1938

2,111,323

UNITED STATES PATENT OFFICE 2,111,323

ENSILAGE HARVESTER

Ellsworth T. Johnson, Moline, Ill., assignor to Deere & Company, Moline, Ill., a corporation of Illinois Application April 23, 1936, Serial No. 76,035

20 Claims. (Cl. 56—16)

The present invention relates to improvements in harvesting machinery of the type designed to cut stalks of plants into short lengths suitable for storing in silos, and is particularly adapted to handle corn stalks. A harvester of this general type is illustrated and described in Patent No. 1,702,551, issued February 19, 1929, to William B. Thiemann, and the present invention contemplates certain improvements in the construction shown and described in that patent.

Harvesters of the type with which the present invention is concerned are known in the art as ensilage harvesters, and they ordinarily comprise a suitable wheel supported frame structure provided with mechanism which cuts and gathers the standing or leaning stalks of corn and carries them to a feed conveyor supported within a hopper or feeder house, which in turn carries the stalks past a beater positioned above the delivery end of the feed conveyor and delivers them between a pair of feeding rollers. The feeding rollers, in turn, feed the stalks to suitable cutting mechanism where they are cut into small pieces, called ensilage, and then delivered to an elevator which delivers the ensilage to a wagon by which it is transported to a silo or other place of storage.

My present invention has for its principal object to provide means for resiliently mounting the upper run of the feed conveyor whereby such upper run may yield or move away from the beater disposed thereabove when an excessive amount of the harvested material is fed onto and carried by the conveyor.

Another object of the invention is to provide means for pivotally mounting the bottom of the hopper or feeder house whereby such bottom may be locked in closed position, or unlocked and swung down to open position to facilitate placing corn stalks by hand on the feed conveyor, thereby avoiding the necessity of feeding the corn stalks by hand from the top of the hopper.

A further object of the present invention is to provide improved means for driving the drive shafts of the conveyor chains of the gathering mechanism of the harvester, whereby positive delivery of power to the conveyor chains is attained.

A still further object of the invention is to provide a construction wherein the boot section or lower end of the wagon elevator is connected to the lower end of the feeder house so as to form a closed continuation of such feeder house, thereby entirely eliminating the possibility of some of the material escaping between the feeder house and the wagon elevator.

A still further object of the present invention is to provide improved means for connecting the upper section of the elevator to the lower or boot section thereof, whereby said upper section may be folded back to thereby cut down the over-all width of the harvester for facilitating transport thereof, particularly through gates and other narrow places.

These and other objects and advantageous features of the present invention will appear from the following description of the preferred embodiment thereof as illustrated in the accompanying drawings, in which:

Figure 1 is a perspective view of the harvester looking at the rear and one side thereof, and showing in dotted lines the bottom of the feed hopper when in open position;

Figure 2 is a top plan view of a portion of the harvester showing the harvester frame and the driving mechanism for certain of the various operating parts;

Figure 3 is a fragmentary rear view of a portion of the harvester, illustrating the driving connections for certain of the operating mechanism mounted within the feeder house, the operating mechanism being illustrated in dotted lines;

Figure 4 is a longitudinal vertical sectional view of a portion of the structure shown in Figure 3, showing the feed conveyor and the yieldably mounted means for resiliently supporting the upper run of the feed conveyor;

Figure 5 is a vertical sectional view on an enlarged scale showing the means for connecting the upper end of the feed table, which supports the upper run of the feed conveyor, to the hopper frame, the section being taken through one of the attaching pins which is shown in elevation;

Figure 6 is a fragmentary vertical transverse sectional view, on an enlarged scale, taken substantially on the plane of the line 6—6 of Figure 3, and illustrating the means for yieldingly supporting the upper run of the feed conveyor adjacent the beater;

Figure 7 is an enlarged detail view of the means employed for securing the bottom of the feed hopper in closed position;

Figure 8 is a rear view of the portion of the harvester shown in Figure 2, and illustrating the means for driving the drive shafts of the lower feed roller, the pitman and the conveyor chains of the gathering mechanism;

Figure 9 is a longitudinal vertical sectional view, on an enlarged scale, taken substantially on the plane of the line 9—9 of Figure 2, and illustrating the gear mechanism by which each of the drive shafts of the conveyor chains of the gathering mechanism is driven;

Figure 10 is a longitudinal vertical sectional view, on an enlarged scale, taken substantially on the plane of the line 10—10 of Figure 2, and illustrating the driving connection between the main power shaft and the shaft of the rotary cutting mechanism;

Figure 11 is a rear view of the harvester showing the means for connecting the upper section of the wagon elevator to the boot section thereof, and illustrating in full lines and dotted lines; respectively, the normal and folded positions of the elevator;

Figure 12 is a sectional view, on an enlarged scale, taken through the elevator, substantially on the plane of the line 12—12 of Figure 11 and illustrating the spring catches for holding the elevator cover in closed position; and Figure 13 is a longitudinal vertical sectional view taken substantially on the plane of the line 13—13 of Figure 2 and illustrating the yielding means for coupling the draft frame to the drawbar of the propelling tractor.

The ensilage harvester illustrated in the accompanying drawings comprises the usual supporting frame structure, indicated as an entirety by the reference numeral 15, rockably mounted on a transversely extending axle 16. The ends of the axle 16 extend outwardly beyond the sides of the frame structure 15 and are journaled in the hubs of supporting wheels 17. The frame structure 15 extends forwardly at one side and supports a pair of gathering arms 18 of the usual construction, and the rear portion of the frame structure 15 supports the ensilage cutting mechanism which is indicated as an entirety in Figure 2 by the numeral 19. The draft frame of the harvester is indicated as a whole by the numeral 21, and it comprises a pair of members suitably journaled on the axle 16 at the side opposite the gathering arms 18 and extending forwardly from said axle and converging together at their front ends where they are connected to the drawbar of the tractor by a coupling indicated as an entirety by the numeral 25 and which will be hereinafter more particularly described.

The gathering arms 18 are each provided with the usual gathering chains 31 which operate to convey the corn stalks rearwardly to the reciprocating knife or cutter which severs the stalks near the ground. The gathering chains then deliver the stalks into a feeder house or hopper 32 (Figure 1) from which the stalks are delivered to the ensilage cutting mechanism 19. This hopper 32 and the ensilage cutting mechanism are disposed transversely of the implement, and are supported on the rear portion of the frame structure 15 by suitable supporting members which it is not deemed necessary to particularly describe herein, as they form no part of the present invention and may be of any conventional construction. The feed hopper 32 is provided with a receiving opening or throat at its upper end to receive the corn stalks conveyed upwardly thereto by the gathering chains 31, the latter acting to tip the corn backward as it approaches the hopper throat. This feed hopper 32 then guides the stalks downwardly, butt end first, onto the feed conveyor indicated as an entirety by the numeral 34.

The feed conveyor 34 is positioned in the lower portion of the feed hopper 32 and serves to feed the material downwardly in the hopper to the cutting mechanism 19 which is partially shown in full lines in Figure 2 and in dotted lines in Figure 3. The feed conveyor 34 comprises a pair of endless chains 36 which are disposed in fixed parallel relationship to each other. These chains 36 are trained over upper sprockets (not shown) and over lower sprockets 37 (see Figure 4) suitably secured to a shaft 38 extending transversely and journaled in any suitable manner in the side walls of the feed hopper 32, and the conveyor is driven by said shaft 38. A plurality of transversely extending conveyor slats 39, preferably made of angle iron, are secured to and extend between the endless chains 36.

As best shown in Figures 4 and 5, the upper run of the endless feed conveyor 34 is supported on a suitable feed table 41 supported on the hopper frame between the upper and lower sprockets of the conveyor. As shown in Figure 5, the upper end of the feed table 41 is connected with the hopper frame by means of an inverted U-shaped bracket 42 which is disposed transversely of the hopper 32. The feed table is supported on the upper surface of the horizontally extending portion of the inverted U-shaped bracket 42, and the vertical legs of the bracket 42 are secured to the opposite side members of the hopper frame by means of transversely extending bolts 43. The table 41 is connected to the horizontally extending portion of the bracket 42 by means of suitable pins 44 extending through the table and through holes 45 in the horizontal portion of the bracket 42, and a cotter pin 46 passed through a hole in the pin below the horizontal portion of the bracket holds the pin against displacement or withdrawal from the bracket. The holes 45 in the horizontal portion of the bracket 42 are made somewhat larger than the diameter of the pins 44 so as to provide sufficient play for the pins in said holes when the lower end of the feed table 41 is raised or lowered in the operation of the harvester.

It sometimes happens that an excessive amount of material is fed into the harvester and onto the feed conveyor 34 by the gathering chains 31, and in order that the harvester may properly accommodate this material without clogging, the lower end of the feed table 41, which supports the upper run of the feed conveyor as above described, is resiliently supported, whereby said table and the upper run of the conveyor supported thereon may yield away from the beater 51 which is supported in fixed bearings in the opposite side walls of the feeder house 32 above and adjacent to the lower or delivery end of the conveyor 34. This beater 51 functions to beat down the material carried on the conveyor to facilitate feeding of such material from the conveyor in between a pair of feed rollers to be hereinafter described. The means for resiliently supporting the lower end of the feed table is best illustrated in Figure 6, and as there shown, an angle iron member 54 is disposed transversely across the feed table 41 and is secured to the lower face thereof as by a plurality of bolts, one of which is shown in dotted lines and indicated by the reference numeral 55. A suitable spacing plate 56 is positioned between the angle member 54 and the table 41, and the opposite ends of the angle iron member 54 extend outwardly beyond the side walls of the hopper 32. An angle iron clip 57 is secured to the outer face of each of the side walls of the hopper 32 by means of a bolt 58 extending through the wall and through the vertical leg of the clip. The horizontal leg of each clip 57 extends outwardly therefrom above the adjacent extended end of the angle iron member 54, and a perforation in the horizontal leg of each clip in alignment with a perforation in the adjacent end of the angle iron member 54 receives a bolt 59. A coiled compression spring 61 is provided on the lower end of each of the bolts 59 and is positioned between the lower face of the horizontal flange of the angle iron member 54 and a nut 62 threaded on said bolt. By the construction described, the lower end of the feed table 41 is capable of yielding or moving downwardly within the limits of the springs 61 under any excessive amount of material that may be fed onto the conveyor, and by this arrangement the possibility of any undue strains being imposed on either the feed conveyor 34 or the beater 51 by such excessive load is eliminated, as is also the possibility of clogging of the harvester, as will be readily appreciated.

From the feed conveyor 34 the material is passed or fed between upper and lower feed rollers 71 and 72 (Figure 4), respectively, said feed rollers delivering the material to the cutting mechanism 19 which comprises a rotary knife or cutter indicated as an entirety by the numeral 73, said cutter operating in conjunction with a stationary knife 74 which is adjustably supported on the frame of the implement adjacent to the rotary cutter 73. Means is provided for adjusting the stationary knife of the cutting mechanism toward the rotary cutting knives and is indicated as an entirety herein by the reference numeral 75. This means, however, will not be described herein as it forms the subject matter of a separate copending application of William B. Thieman, Serial No. 80,699, filed May 20, 1936, and reference may be had to that application for a complete showing and description thereof if desired. This cutting mechanism cuts the stalks up into short pieces known in the art as ensilage. The ensilage material drops from the cutting mechanism into the lower end of an upwardly inclined wagon elevator indicated as an entirety by the reference numeral 77, the outer end of said wagon elevator, when in operating position, being disposed to extend over a wagon drawn alongside of the harvester, as is customary in the use of implements of this type.

In the use of ensilage harvesters, three rows of stalks are usually cut by hand to open up a field, these stalks being loaded on a rack and hauled to the harvester to be fed into it by hand, and in prior devices this material had to be fed into the top of the hopper, which was inconvenient. Also, in the operation of harvesters of this type, when the material is unusually thick and heavy, as is sometimes the case, it frequently happens that the material becomes clogged in the feed hopper, which, of course, retards the operation of the machine. In order to relieve this clogged condition when it occurs, it is necessary that the operator remove a portion of the material so that the machine may run more freely. In the present construction, therefore, means has been provided whereby the operator may have access to the interior of the hopper below the upper end thereof easily and quickly and without any undue labor on his part, whereby stalks may be fed to the feed conveyor by hand or such clogged condition be eliminated. This means comprises providing the upper portion of the hopper with a removable bottom 81 (Figure 1). This bottom 81 is hingedly mounted as shown at 82 to the under side of the feed hopper 32 a short distance above the upper end of the feed conveyor 34 so that the bottom 81, when opened, swings downwardly and outwardly into the position shown in dotted lines in Figure 1. The bottom 81 is normally locked in closed position by means of a plurality of fastening devices 83, as will now be described.

One of the fastening devices 83 is illustrated in detail in Figure 7, and comprises a member formed of a section of Z-bar having its lower horizontal leg 84 fixed to the removable bottom 81 by a pair of bolts or rivets 85. The vertical or intermediate portion 86 of the fastening device is of such size that when the bottom 81 is swung into closed position the upper surface of the upper horizontal leg 87 of the fastening device will engage and lie flush against the under surface of the frame bar 88 which supports the hopper or feeder house 32. Suitable aligned slots 89 and 90 are provided in the members 87 and 88, respectively, to receive a locking bolt 91, which serves to lock the bottom 81 in closed position. In order to provide for easily and quickly opening the bottom when desired, an enlarged opening 92 is provided at the upper end of the slot 89, and such enlarged opening 92 is of such a size that the head of the locking bolt may pass freely therethrough. When it is desired to open the bottom 81 of the hopper, it is necessary only to loosen the bolts 91 of the several fastening devices and slide them upwardly until the heads thereof register with the enlarged openings 92, whereupon the bottom 81 may be swung downwardly and outwardly about its hinge connection 82. By this construction, therefore, access may readily be had to the interior of the hopper.

The wagon elevator of the present invention, indicated as an entirety by the reference numeral 77, is best shown in Figure 11. It comprises a lower housing section or boot portion 101 and an upper housing section 102, said two sections being suitably connected together by a pair of hinges 103, one of such hinges being positioned on each side of the housing. The boot section 101 of the elevator is mounted in fixed position on the feeder house 32 and forms a continuation thereof, whereby there is no opening between the feeder house and the lower end of the elevator. The boot section 101 is further held in position by suitable brace members 104 provided at each side thereof. One portion of each hinge 103 is secured in any suitable manner to the outer end of the adjacent brace member 104 while the companion portion of each hinge is fixedly secured to the adjacent side wall of the upper housing section 102 of the elevator. The upper section 102 of the elevator is supported in normal operating position (shown in full lines in Figure 11) by a pair of suitable truss rods 105. One of these truss rods 105 is pivotally connected to each side of the elevator, and each of the truss rods extends inwardly and downwardly therefrom and has its inner end pivotally connected to a bracket 106 fixed in any suitable manner to the feeder house 32. The truss rods 105 are jointed between their ends, as shown, so that they may fold when the section 102 of the elevator is moved upwardly slightly, as when striking the wagon box when traveling over uneven ground or when folded back into transport position as shown in dotted lines in Figure 11.

The lower portion of the top wall 111 of the upper housing section 102 of the elevator 77 is cut away, and a cover member 112, which is hinged at its upper end as indicated at 113 to the lower end of the top wall 111, is provided over this opening. The cover member 112 is normally held closed by suitable spring catches 114, one of which is provided at each side of the housing section 102 as best shown in Figure 12. If the upper housing section 102 of the elevator should be raised slightly, as by striking the wagon box when the implement is traveling over uneven ground, the lower edge of the cover member 112 will slide over the hood 115, which is disposed over the lower boot section 101 of the elevator, against the tension of the spring catches 114, as will be readily understood. When the upper section 102 of the elevator is to be folded back over the harvester into transport position, it is first necessary to unlatch the cover 112 and swing it back upon the top wall 111 of the section 102 where it is secured in place by a pivoted clip 116. This swinging back of the cover member 112 is necessary in order to provide clearance for the upper section 102 of the elevator to fold over the hood 115 of the boot section 101.

In order to support the upper section 102 of the elevator in transport position as shown in dotted lines in Figure 11, a suitable brace member 117 is provided at each side of the section 102. The upper end of each brace member 117 is pivotally connected at its upper end to the adjacent side wall of the section 102, and its lower end is supported in a suitable opening provided therefor in the bracket 106 before referred to. When the elevator is arranged in operating position, the lower end of each brace member 117 is supported in a suitable clip 118 provided therefor on the adjacent side wall of the upper elevator section 102.

By providing the construction of elevator as above described, no opening is present between the feeder house and the elevator, as is the case in prior constructions with which I am familiar wherein the elevator is pivoted at its extreme lower end to the feeder house, and, therefore, there is no chance in the present construction of any of the material escaping as it is being delivered from the feeder house to the elevator as there was with such prior constructions. Also, by constructing the elevator in two sections and fixedly securing the lower section to the feeder house, a strong and rigid construction is obtained, and, furthermore, this arrangement permits the upper section 102 of the elevator to be folded over into transport position without interfering with any of the harvester mechanism as was the case with elevators pivoted at their extreme lower ends to the feeder house.

Coming now to the means for driving the operating or moving parts of the harvester, these several parts are driven by power derived from the engine of the propelling tractor through a power take-off shaft which extends rearwardly from the tractor and is operatively connected to a main power shaft 121 which is supported in any suitable manner on the draft frame 21 of the harvester as shown in Figure 2. As best shown in Figure 10, the power shaft 121 is connected by means of a universal joint telescopic shaft connection 122 with a shaft 123 journaled in a housing 124 supported in any suitable manner on the harvester frame. A gear 125 is keyed or otherwise suitably secured to the rear end of the shaft 123 within the housing 124, and meshes with a gear 126 journaled on a shaft 127 also journaled in the housing 124. The rotary cutter 73 of the harvester, which has been before referred to, is fixedly mounted in any suitable manner on the rear end of the shaft 127, and an overrunning clutch 128 is provided on the forward end of the shaft 127 through which the power is transmitted from the gear 126 to the shaft 127 and to the rotary cutter 73.

A pitman drive shaft 129 is suitably supported on the frame 15 and extends parallel to the shaft 123. This pitman drive shaft 129 is driven through a slip clutch 130, and a drive chain 131 trained over sprockets 132 and 133 provided on the shafts 123 and 129, respectively. A flywheel 134 is mounted on the forward end of the shaft 129 and a pitman 135 extends between an eccentrically mounted stud 136 on the flywheel 134 and a reciprocating knife 137 which operates to sever the stalks near the ground. The gathering chains 31 are driven by power from the shaft 129 by means of a drive chain 138 trained over a sprocket 139 on the shaft 129 and over sprockets 140 and 141 fixed on stub shafts 142 and 143, respectively. A pair of idler sprockets 144 suitably supported on the implement frame serve to maintain the chain 138 at the proper tension. A bevel gear 145 (see Figure 9) is also provided on each of the stub shafts 142 and 143, and each of said bevel gears 145 meshes with a similar bevel gear 146, one of said bevel gears 146 being secured on the lower end of each of two upwardly inclined gathering chain drive shafts 147 (see Figures 2 and 9). It will be seen, therefore, that each of the gathering chains 31 is provided with a separate drive shaft 147, and a suitable sprocket (not shown) is secured on the upper end of each of the drive shafts 147 over which the adjacent gathering chain 31 is trained. It will be seen from the foregoing that by providing the means for driving the gathering chain drive shafts 147 from the pitman drive shaft 129 which comprises the single drive chain 138, a simple and economical driving arrangement that assures positive delivery of power to the gathering chains is provided.

The lower feed roller 72 is fixedly mounted on a transversely extending shaft 148, the ends of said shaft projecting outwardly beyond the side walls of the feeder house 32. As shown in Figure 8, a sprocket 149 is fixed to the forward end of this shaft 148, and engages with and is driven by the drive chain 131. As shown in Figure 3, a sprocket 150 is fixed to the rear end of the shaft 148 and over this sprocket is trained a drive chain 151. The drive chain 151 also extends over a driving sprocket 152 suitably secured on the rear end of the shaft 38 by means of which the conveyor 34 is driven, as before described. Another sprocket 153 is also mounted on the shaft 38, adjacent the outer side of the sprocket 152, and a driving chain 154 is trained around the sprocket 153 and extends upwardly around one side of a sprocket 155 fixed on the rear end of a shaft 156, which latter shaft supports the beater 51 which has been before referred to. A pair of idler sprockets 157 journaled on stub shafts fixedly mounted in a bracket 158 disposed above the sprocket 155 and suitably secured to the rear side wall of the feeder house 32 serve to hold the opposite runs of the chain 154 in the desired spaced relation.

As shown in Figure 3, the endless conveyor 159 (Figure 12) of the wagon elevator 77 is driven by a drive chain 160 (Figure 3) trained over a sprocket 161 fixed to the lower shaft 162 of the conveyor 159 and over a sprocket 163 fixed to the shaft 148 on the outer side of the sprocket 150. Idler rollers 164 journaled on stub shafts suitably secured to the implement frame serve to keep the drive chain 160 at the desired tension.

The upper feed roller 71, before referred to, is driven by power derived from the shaft 156 by a drive chain 165 trained over a sprocket (not shown) fixed on the shaft 156 on the inner side of the sprocket 155, and over a sprocket 166 fixed on the rear end of a shaft 167 on which the upper feed roller 71 is suitably fixed so as to rotate therewith. This upper feed roller and its supporting shaft 167 are floatingly supported for vertical swinging movement within the limits of arcuate slots 168 formed in the opposite side walls of the feeder house 32, as shown by dotted lines in Figure 3, the opposite ends of the shaft 167 projecting through such slots. Each end of the shaft 167 is suitably supported in the lower end of an arm 169 having its upper end journaled on the beater shaft 156, whereby said arms 169 have swinging movement on said shaft. An idler sprocket 171 suitably journaled on a stub shaft on a bracket 172 carried by one of the arms 169, as shown in Figure 3, serves as a chain tightener for the upper feed roller driving chain 165. The means for supporting the upper feed roller 71 for vertical swinging movement relative to the lower feed roller 72 forms the subject matter of a separate application filed by Paul H. Westerlund on April 23, 1936, Serial No. 76,022. As the present invention is not particularly concerned with such structure, it is not believed necessary to describe the same in detail herein, and reference may be had, if desired, to such other application for a complete showing and description of such structure.

Referring now more particularly to Figure 13, the coupling between the draft frame 21 of the implement and the drawbar of the tractor includes a plate 181 which is secured at its rear end to the forward end of the draft frame by a pair of rivets 182, or in any other suitable manner. The forward end of the plate 181 projects beyond the front end of the draft frame 21 and is bent backwardly upon itself to form a thickened portion at the front end thereof. A vertically extending hole 183 is provided in this thickened portion of the plate 181 to receive the upper end of a coupling pin 184. A shoulder 185 is formed on the coupling pin 184 between the ends thereof, said shoulder being of a diameter larger than the hole 183 in the plate 181 and also larger than a hole 186 formed in the tractor drawbar 187 near the rear end thereof and through which latter hole the lower end of the pin 184 extends. The lower end of the pin 184 is secured to the rear end of the tractor drawbar 187 by means of a nut 188 screwed on the threaded lower end of the pin, the nut securely clamping the drawbar against the lower side of the shoulder 185. The plate 181 of the draft frame is held in yielding engagement against the upper side of the shoulder 185 on the pin 184 by a coiled compression spring 189 which encircles the upper end of the pin and is positioned between the upper side of the plate 181 and a washer 191 retained in position on the pin by means of a nut 192 screwed onto the threaded upper end of the pin. It will be noted that the hole 183 in the plate 181 is of a diameter somewhat larger than the diameter of the pin 184, whereby a limited amount of movement of the plate 181 relative to the pin 184 is permitted. By this arrangement, the implement and the tractor may rock relative to each other to a certain extent, when traveling over uneven ground, thereby relieving the drawbar 187 and the draft frame 21 of twists and strains that would otherwise be imparted to them and might possibly result in damage to or breakage of the parts.

It is believed that the operation of the implement will be readily apparent to those skilled in the art from the foregoing description thereof, and therefore, further discussion herein is not deemed necessary.

I claim:

1. In a harvesting machine, stalk gathering mechanism, means for operating on the gathered stalks, an endless conveyor for carrying the stalks from said gathering mechanism to said operating means, means supporting the opposite ends of said endless conveyor, a table supporting the upper run of the conveyor which carries the stalks, and resiliently yieldable means for holding the table in position and providing for relative movement between the table and said conveyor supporting means.

2. In a harvesting machine, stalk gathering mechanism, means for operating on the gathered stalks, an endless conveyor for carrying the stalks from said gathering mechanism to said operating means, means supporting the opposite ends of said endless conveyor in fixed position, and resiliently yieldable means separate from said end supporting means for supporting the upper run of said conveyor between its ends whereby said upper run between its ends may yield downwardly to a certain extent.

3. In a harvesting machine, stalk gathering mechanism, means for operating on the gathered stalks, an endless conveyor for carrying the stalks from said gathering mechanism to said operating means, means supporting the opposite ends of said conveyor, a table supporting the upper run of said conveyor which carries the stalks, and means separate from said conveyor supporting means for resiliently supporting one end of said table whereby said table and the upper run of the conveyor supported thereby may yield downwardly.

4. In a harvesting machine, stalk gathering mechanism, means for operating on the gathered stalks, an endless conveyor for carrying the stalks from said gathering mechanism to said operating means, means supporting the opposite ends of said endless conveyor in fixed position, a table separate from said conveyor supporting means supporting the upper run of the conveyor which carries the stalks, and means for resiliently supporting one end of said table, whereby said table and the upper run of the conveyor supported thereby may yield downwardly.

5. In a harvesting machine, stalk gathering mechanism, means for operating on the gathered stalks, an endless conveyor for carrying the stalks from said gathering mechanism to said operating means, means supporting said endless conveyor, a table supporting the upper run of said conveyor which carries the stalks, a beater disposed in fixed position above one end of said table, means separate from said conveyor supporting means for resiliently supporting the end of said table adjacent said beater, whereby said table and the upper run of the conveyor supported thereby may yield downwardly away from said beater, and pivot means supporting the other end of the table.

6. In a harvesting machine, stalk gathering mechanism, means for operating on the gathered stalks, an endless conveyor for conveying the stalks from said gathering mechanism and delivering them to said operating means, means supporting the upper and lower ends of said endless conveyor in fixed position, a table extending between the opposite ends of said endless conveyor and supporting the upper run of the conveyor which carries the stalks, a beater disposed in fixed position above the lower end of said table, and means for resiliently supporting the lower end of said table whereby said table and the upper run of the conveyor supported thereby may yield downwardly away from the beater when an excessive amount of material is fed between said conveyor and said beater.

7. In a harvesting machine, stalk gathering mechanism, means for operating on the gathered stalks, an endless conveyor for conveying the stalks from said gathering mechanism to said operating means, a housing enclosing said conveyor, means supporting the upper and lower ends of said endless conveyor in fixed position in said housing, a table extending between the upper and lower ends of said endless conveyor and supporting the upper run of the conveyor which carries the stalks, a beater positioned in fixed bearings in the side walls of the housing above the lower end of said table, and means for resiliently supporting the lower end of said table whereby said table and the upper run of the conveyor supported thereby may yield downwardly away from the beater when an excessive amount of material is fed between said conveyor and said beater, said supporting means comprising spring means disposed at each side of and connected with said table, and means connecting said spring means with the side walls of the housing.

8. In a harvesting machine, stalk gathering mechanism, means for operating on the gathered stalks, an endless conveyor for conveying the stalks from said gathering mechanism to said operating means, a housing enclosing said conveyor, means supporting the upper and lower ends of said endless conveyor in fixed position in said housing, a table extending between the upper and lower ends of said endless conveyor and supporting the upper run of the conveyor which carries the stalks, a beater positioned in fixed bearings in the side walls of the housing above the lower end of said table, and means for resiliently supporting the lower end of said table whereby said table and the upper run of the conveyor supported thereby may yield downwardly away from the beater when an excessive amount of material is fed between said conveyor and said beater, said last named means comprising an angle iron clip at each side of the housing and having one leg secured to the housing, a compression spring at each side of said table on which said table rests, and means supporting said springs from the other legs of said clips.

9. In a harvesting machine, stalk gathering mechanism, means for operating on the gathered stalks, an endless conveyor for conveying the stalks from said gathering mechanism to said operating mechanism, a housing enclosing said conveyor, means supporting the upper and lower ends of said endless conveyor in fixed position in said housing, a table extending between the upper and lower ends of said endless conveyor and supporting the upper run of the conveyor which carries the stalks, a beater positioned in fixed bearings in the opposite side walls of the housing above the lower end of said table, and means for resiliently supporting the lower end of said table whereby said table and the upper run of the conveyor supported thereby may yield downwardly away from the beater when an excessive amount of material is fed between said conveyor and said beater, said means comprising a compression spring at each side of said table on which said table rests, means supporting said springs on the side walls of the housing comprising an angle iron clip having one leg secured to the housing and a bolt extending through the other leg of said clip and through said table, said spring encircling said bolt between one end thereof and the table whereby said table may yield within the limits of said spring.

10. In a harvesting machine, stalk gathering mechanism, means for operating on the gathered stalks, an endless conveyor for conveying the stalks from said gathering mechanism to said operating means, a housing enclosing said conveyor, mean supporting the upper and lower ends of said endless conveyor in fixed position in said housing, a table extending between the upper and lower ends of said endless conveyor and supporting the upper run of the conveyor which carries the stalks, a beater positioned in fixed bearings in the opposite side walls of the housing above the lower end of said table, and means for resiliently supporting the lower end of said table whereby said table and the upper run of the conveyor supported thereby may yield downwardly away from the beater when an excessive amount of material is fed between said conveyor and said beater, said means comprising a transversely extending supporting member secured to the lower face of said table adjacent the lower end thereof and having its opposite ends extending outwardly beyond the side walls of the housing, an angle iron clip secured to each side wall of the housing and having one leg thereof overlying the adjacent outer end of said supporting member, a bolt extending through aligned holes in each of said clips and the adjacent outer ends of said supporting member, a nut screwed on the lower end of each bolt, and a coiled compression spring encircling each of said bolts and positioned between said nut and the lower face of said supporting member, whereby said table may yield downwardly within the limits of said spring.

11. In a harvesting machine, a frame, stalk gathering mechanism, means for operating on the gathered stalks, an endless conveyor for carrying the stalks from said gathering mechanism to said operating means, a table supporting the upper run of said conveyor which carries the stalks, and means for supporting one end of said table comprising an inverted U-shaped member having its horizontal portion extending transversely of said table and underlying the same and having its vertical legs bolted to the frame of the machine, a plurality of pins extending through said table and through holes in said horizontal portion of said member, the hole in said leg being larger than the pin to provide for movement of said pin in said hole.

12. In a harvesting machine, a frame, stalk gathering mechanism, means for operating on the gathered stalks, an endless conveyor for carrying the stalks from said gathering mechanism to said operating means, a table supporting the upper run of said conveyor which carries the stalks, and means for supporting one end of said table, comprising an inverted U-shaped member having its horizontal portion extending transversely of said table and underlying the same and having its vertical legs bolted to the frame of the machine, a plurality of pins extending through said table and through holes in said horizontal portion of said member, the hole being larger than the pin to provide for movement of said pin in said horizontal leg, and means for yieldingly supporting the opposite end of the table for limited vertical movement, said means comprising a compression spring at each side of said table on which said table rests and means supporting said springs on said frame, whereby the opposite end of said table may yield vertically relatively to said first mentioned end, the play of the pins in said holes on said first mentioned end permitting such vertical yielding movement.

13. A tractor drawn harvester comprising, in combination, a pair of spaced gathering arms, stalk gathering means carried by each of said arms, a drive shaft for each of said gathering means, a driving sprocket on each of said drive shafts, a cutter for severing the stalks, a pitman drive shaft for driving said cutter, means for driving said pitman drive shaft from the power take-off shaft of the tractor, and means for driving the driving sprockets of said drive shafts from said pitman drive shaft.

14. A tractor drawn harvester comprising, in combination, a pair of spaced gathering arms, stalk gathering means carried by each of said arms, a drive shaft for each of said gathering means, a driving sprocket on each of said drive shafts, a cutter for severing the stalks, a pitman drive shaft for driving said cutter, means for driving said pitman drive shaft from the power take-off shaft of the tractor, and a single drive chain trained around a sprocket on said pitman drive shaft and around the driving sprockets on the drive shafts of the gathering means for driving the latter shafts from said pitman drive shaft.

15. In a harvester, stalk gathering mechanism, a feeder house into which the stalk gathering mechanism delivers the stalks, a feed conveyor in said feeder house, the bottom wall of the feeder house being movably connected with the latter, whereby said bottom may be moved outwardly away from said feeder house to provide access to the interior of the feeder house adjacent the upper end of the conveyor, and detachable means for locking said bottom in normal closed position.

16. In a harvester, stalk gathering mechanism, a feeder house into which the stalk gathering mechanism delivers the stalks, a feed conveyor in said feeder house, the bottom wall of the feeder house being hinged to said feeder house adjacent the upper end of the feed conveyor, whereby said bottom wall may be swung outwardly and downwardly away from said feeder house to provide access to the interior of the feeder house adjacent the upper end of the conveyor, and detachable means for locking said bottom in normal closed position, said detachable means comprising a plate secured to said bottom, a slot in said plate, a member secured to said feeder house and having a slot aligning with the slot in said plate, a bolt extending through said slots, the slot in said plate being enlarged at one end to permit passage therethrough of the head of the bolt to thereby unlock said bottom.

17. In a harvester, stalk gathering mechanism, a feeder house into which the stalk gathering mechanism delivers the stalks, a frame bar for supporting said feeder house, said frame bar extending along said feeder house adjacent to and parallel with the bottom wall thereof, a feed conveyor in said feeder house, the bottom wall of the feeder house being hinged to said feeder house adjacent the upper end of the feed conveyor whereby said bottom wall may be swung outwardly and downwardly away from said feeder house to provide access to the interior of the feeder house adjacent the upper end of the conveyor, and detachable means for locking said bottom in closed position, said detachable means comprising a Z-shaped plate having its bottom leg secured to said bottom wall and its upper leg adapted to engage and lie parallel to said frame bar, a slot formed in the upper leg of said plate in alignment with a slot formed in said frame bar, a bolt extending through said slots, the slot in said plate being enlarged at one end to permit the passage therethrough of the head of the bolt to thereby unlock said bottom wall.

18. In a harvesting machine, stalk gathering mechanism, a feeder house for receiving the stalks from said stalk gathering mechanism, cutting mechanism in said feeder house for cutting up the stalks into ensilage, and an elevator for receiving the ensilage from the cutting mechanism and delivering the same, said elevator comprising a lower boot section secured to said feeder house and an upper section pivotally connected to the upper portion of said boot section and adapted to be folded back thereover into transport position.

19. In a harvesting machine, stalk gathering mechanism, a feeder house for receiving the stalks from said stalk gathering mechanism, cutting mechanism in said feeder house for cutting up the stalks into ensilage, and an elevator for receiving the ensilage from the cutting mechanism and delivering the same, said elevator comprising a lower boot section secured at its lower end to said feeder house, an upper section adapted to fold back over the lower boot section in transport position, a brace member at each side of said boot section, said brace members having one end connected to said boot section adjacent the upper end thereof and connected at their opposite ends to said feeder house, and means pivotally connecting said lower boot section and said upper section and comprising a hinge at each side of said elevator including a member secured to said brace member and a second member pivotally connected to said first member and secured to the side wall of the upper elevator section.

20. In a harvesting machine, stalk gathering mechanism, means for operating on the gathered stalks, an endless conveyor for carrying the stalks from said gathering mechanism to said operating means, means supporting said endless conveyor, a table supporting the upper run of said conveyor which carries the stalks, a beater disposed in fixed position above one end of said table, means for resiliently supporting the end of said table adjacent said beater, whereby said table and the upper run of the conveyor supported thereby may yield downwardly away from said beater and relative to said conveyor supporting means, and pivot means supporting the other end of the table.

ELLSWORTH T. JOHNSON.